UNITED STATES PATENT OFFICE 2,647,116

CYANINE DYE SALTS

William Howells Vinton, Parlin, N. J., assignor to E. I. du Pont de Nemours and Company, Wilmington, Del., a corporation of Delaware No Drawing. Application August 30, 1950, Serial No. 182,427

9 Claims. (Cl. 260—240.65)

This invention relates to cyanine dye salts which have a high degree of water-solubility. More particularly it relates to cyanine dye salts where the anion is a butanesulfonate and to their preparation. Still more particularly it relates to mono- and tri-methine cyanine dye salts from methyl and ethyl n-butane-sulfonates. The invention also relates to intermediates for preparing such dye salts.

Cyanine dye salts which contain aromatic sulfonate anions, e. g., p-toluenesulfonate are known. While good sensitizers, they have a low solubility in water which is disadvantageous because a residual stain is often left in finished photographs. Cyanine dyes containing methane- and ethane-sulfonate anions have been proposed and are more soluble than the p-toluene-sulfonate salts. It has been found that cyanine dye salts which contain relatively high alkanesulfonate anions are decidedly more soluble than the p-toluene sulfonate salts but are difficult to prepare in satisfactory yields by the conventional method of preparation, e. g., condensation of a cycloammonium salt containing a higher alkanesulfonate anion and a reactive group in the $\alpha$ or $\gamma$ position to the heterocyclic nitrogen atom.

An object of this invention is to provide a new class of cyanine dye salts. A further object is to prepare such salts which are soluble in water to a high degree. A more specific object is to provide new monomethine and trimethine cyanine dyes which have a high degree of water solubility and do not leave a residual stain in finished photographic elements. Another object is to provide a method of preparing such salts with practical yields. Still other objects will be apparent from the following description of the invention.

It has been found that mono- and tri-methine cyanine salts which contain an n-butanesulfonate anion and have a methyl or ethyl group attached to the heterocyclic nitrogen atom are unique and have a high degree of solubility in water which is totally unexpected in view of the characteristics of lower and high homologues. These novel cyanine salts have the general formula:

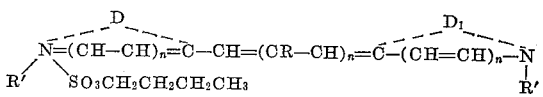

(I)

where D and $D_1$ are the same or different and each is the residue of a heterocyclic nitrogen nucleus selected from the class consisting of oxazole, thiazole, selenazole, iminazole; thiazoline and pyridine and their benzo-homologues; R is a member taken from the group consisting of hydrogen, alkyl and aryl radicals, R' is an alkyl radical of 1 to 2 carbon atoms and $n$ is a cardinal number taken from the group consisting of 0 and 1.

Symmetrical trimethine dyes of the above type can be advantageously prepared by reacting the methyl or ethyl n-butanesulfonate salt of an azole, thiazoline, pyridine or quinoline base which contains a reactive methyl group in the $\alpha$- or $\gamma$-position to the heterocyclic nitrogen atom with an orthoester of a carboxylic acid, e. g., methyl orthoformate, ethyl orthoformate, ethyl orthoacetate, ethyl orthopropionate, ethyl orthobenzoate, etc., in the presence of an acid binding solvent or organic base, e. g., pyridine, piperidine, triethylamine, etc. The reaction takes place by heating the mixture to a moderate temperature, e. g., 110 to 120° C. under conditions of reflux. The methyl or ethyl butanesulfonate salt of the heterocyclic base may be preformed or may be formed in situ simultaneously with the dye condensation reaction.

Unsymmetrical dyes of the above type can be prepared from the methyl or ethyl n-butanesulfonate salt of an azole, thiazoline, pyridine, or quinoline base having a $\beta$-anilinovinyl or acetanilidovinyl group in the $\alpha$- or $\gamma$-position to the cyclic nitrogen atom, by condensing such salt with a different heterocyclic nitrogen salt containing the same anion which has a reactive methyl in the $\alpha$- or $\gamma$-position to the cyclic nitrogen atom. The resulting salts are new compounds.

Monomethine dyes, for example, can be made by condensing the methyl or ethyl n-butanesulfonate salt of an oxazole, thiazoline, pyridine or quinoline base which contains a reactive methyl group in the $\alpha$- or $\gamma$-position to the heterocyclic nitrogen atom with an n-butanesulfonate cycloammonium salt of an azole, thiazoline, pyridine or quinoline base including an N-dialkylindolenine, which contains an alkylmercapto, e. g., methylmercapto or ethylmercapto group in the $\alpha$- or $\gamma$-position to the heterocyclic nitrogen atom in the presence of an acid binding solvent or organic base, e. g., pyridine, piperidine, triethylamine, etc., by heating the admixture to a moderate temperature, e. g., under conditions of reflux.

As stated above, the methyl and ethyl n-butanesulfonates of heterocyclic nitrogen bases containing the above reactive groups are new compounds. They can be prepared by admixing the appropriate heterocyclic nitrogen base and the methyl or ethyl n-butanesulfonate in approximately equimolecular proportions, although the latter ingredient can be present in excess if desired, and heating the mixture to a temperature from 120 to 140° C. for a period of 1 to 48 hours.

The carbocyanine dyes of Formula I are useful photographic sensitizing dyes and may be incorporated with colloid-silver halide emulsions of various types including silver chloride, silver bromide, silver chlorobromide, silver iodobromide, simple and mixed emulsions. Various types of water permeable colloids can be used as binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, polyvinylacetals, etc.

The invention will be further illustrated but is not intended to be limited by the following examples.

*Example I*

Preparation of the symmetrical monomethine dye of the formula:

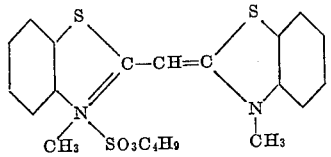

In a suitable flask there were placed 1.49 grams (0.01 mole) of 2-methylbenzothiazole and 1.52 grams (0.01 mole) of methyl n-butanesulfonate, and the mixture was heated together for two hours at 130° C. whereby a cycloammonium salt (salt A) was formed from the reactants. Meanwhile 1.81 grams (0.01 mole) of 2-methylmercaptobenzothiazole and 1.52 grams (0.01 mole) of methyl n-butanesulfonate were also fused together at 120–130° C. for a two hour period and another cycloammonium (salt B) was formed from these reactants. Salt A and salt B were each dissolved in 20 ml. of ethanol; the solutions were combined and heated to reflux, following which 2.02 grams (0.02 mole) of triethylamine was added. The solution took on a reddish yellow color and, after five minutes of refluxing, was diluted with dry ether. The resulting precipitate was filtered off and recrystallized twice from acetone to yield a yellow dye, M. P. 293–300° C. which had the above structural formula. An ethanol solution of the dye had an absorption maximum at 422 mu.

A small amount of the dye was added to a gelatino silver chlorobromide emulsion of the lithographic type and was found to extend the sensitivity to 480 millimicrons with a peak at 440 millimicrons.

*Example II*

Preparation of the unsymmetrical monomethine dye of the formula:

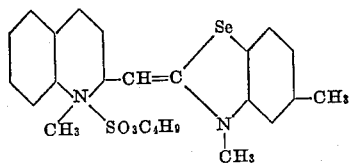

In a suitable flask there were placed 1.75 grams (0.01 mole) of 2-methylmercaptoquinoline and 1.52 grams (0.01 mole) of methyl n-butanesulfonate. This mixture was heated together at 130° C. for three hours whereby a cycloammonium salt (salt A) was formed. Similarly 2.10 grams (0.01 mole) of 2,5-dimethylbenzoselenazole and 1.52 grams (0.01 mole) of methyl n-butanesulfonate were fused together at 130° C. for three hours and another cycloammonium salt (salt B) was formed. Salt A and salt B were each dissolved in 15 ml. of ethanol; these solutions were combined, heated to reflux, and then 2.02 grams (0.02 mole) of triethylamine was added. The solution was kept at the reflux temperature for five minutes, and a deep orange color developed. The oily product was precipitated out by diluting the solution with dry ether. The supernatant liquid was decanted, and the oil was treated with acetone, causing the dye to crystallize. The dye which has the above formula was filtered off, washed with acetone and then recrystallized from four liters of acetone. The red crystals had a melting point at 140–142° C. The ethanol solution of the dye showed an absorption maximum at 494 mu.

A gelatino silver chlorobromide of the lithographic type when sensitized with this dye acquired an extra range of sensitivity which extended out to 560 millimicrons with a maximum at 530. A developed and fixed photographic paper made from this emulsion was found to be entirely free from residual dye stain.

*Example III*

Preparation of the symmetrical carbocyanine dye of the formula:

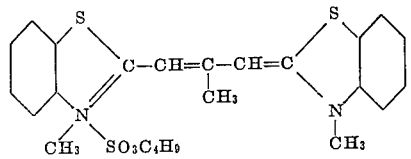

In a suitable reaction vessel there were placed 4.47 grams (0.030 mole) of 2-methylbenzothiazole, 4.56 grams (0.030 mole) of methyl n-butanesulfonate and the mixture was heated on an oil bath at 130° to 140° C. for a period of about 40 hours. There were then added 40 ml. of anhydrous pyridine and 10 ml. (0.058 mole) of ethyl orthoacetate and the mixture heated to a temperature of 116° C. under conditions of reflux for a period of 30 minutes. The dye was precipitated out by diluting the solution with dry diethyl ether and recrystallized from acetone. The purple crystals of the dye which were recovered melted at 215–6° C. and had the above formula. An ethanol solution of the dye showed an absorption maximum at 543 millimicrons.

A gelatino silver bromide iodide emulsion containing this dye had its sensitivity extended to 670 millimicrons with peaks at 520 and 600.

*Example IV*

Preparation of the symmetrical carbocyanine dye of the formula:

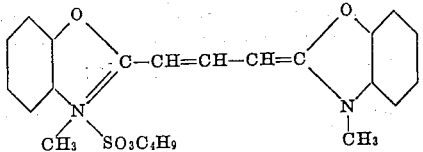

In a suitable reaction vessel there were placed 2.66 grams (0.02 mole) of 2-methylbenzoxazole and 3.04 grams (0.02 mole) of methyl n-butanesulfonate and the mixture was heated on an oil bath to a temperature of 130° C. for one hour. There were then added 5 ml. (0.030 mole) of ethyl orthoformate and 20 ml. of anhydrous pyridine and the mixture heated to reflux (116° C.) for 10 minutes. A red color formed and the resulting dye was precipitated out on cooling the reaction mixture. The dye was filtered off, washed with acetone and then recrystallized from a mixture of alcohol and ether. The dye crystals melted at 242°–245° C. and an alcoholic solution of the dye gave an absorption maximum at 486 mu. The dye sensitized a gelatino silver chlorobromide paper emulsion out to 540 mu with a sensitivity peak at 500 mu.

*Example V*

Preparation of the symmetrical carbocyanine dye of the formula:

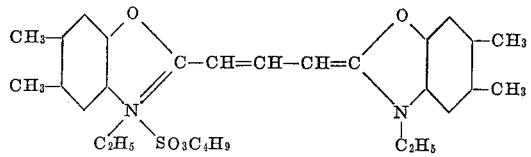

In a reaction vessel there were placed 3.22 grams (0.02 mole) of 2,5,6-trimethylbenzoxazole and 3.32 grams (0.02 mole) of ethyl n-butanesulfonate and the mixture was heated on an oil bath to a temperature of 130° C. under reflux for 16 hours. There were then added 6 ml. (0.036 mole) ethyl orthoformate and 40 ml. of pyridine and the mixture heated at a temperature of 116° C. for a period of ten minutes. Acetone was added and the solution cooled to precipitate out the dye which was recrystallized from acetone solution. The red dye crystals which were recovered had a melting point of 210–12° C. and the dye had the above formula. An ethanol solution of the dye showed an absorption maximum at 498 millimicrons.

A gelatino silver chlorobromide emulsion of the lithographic type containing the dye had an additional range of sensitivity extending to 570 millimicrons with a peak at 530 millimicrons. A silver iodobromide emulsion similarly treated had its sensitivity extended to 560 millimicrons with a peak at 530 millimicrons. Photographic papers containing the dye showed no residual stain after exposure and processing to a silver image picture.

*Example VI*

Preparation of the symmetrical carbocyanine dye of the formula:

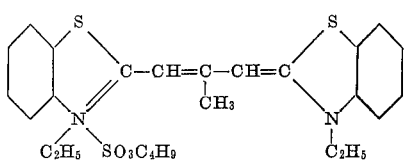

This dye was prepared as described in Example III by substituting an equivalent amount of ethyl n-butaneosulfonate for the methyl butanesulfonate. The dye was precipitated by adding a mixture of diethyl ether and acetone and recrystallized from acetone. It had the above formula and the purple dye crystals had a melting point of 213–215° C. An ethanol solution of the dye showed an absorption maximum at 545 millimicrons.

A gelatino silver chloride lithographic type emulsion containing the dye had its normal sensitivity extended to 660 millimicrons with a peak at 600 millimicrons. A gelatino silver iodobromide emulsion containing the dye had an extra range of sensitivity extending to 670 millimicrons with a peak at 630 millimicrons.

*Example VII*

Preparation of the symmetrical carbocyanine dye of the formula:

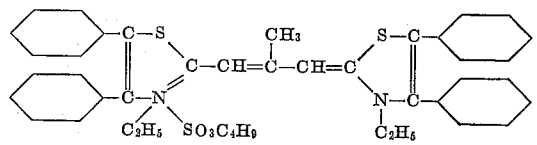

In a glass vessel there were placed 7.53 grams (0.03 mole) of 2-methyl-4,5-diphenylthiazole and 4.98 grams (0.03 mole) of ethyl n-butanesulfonate. The mixture was heated over an oil bath for three hours at 130–140° C. There were then added 40 ml. of anhydrous pyridine and 10 ml. of ethyl orthoacetate. The mixture was then heated to reflux for 15 minutes and then cooled. The reaction mixture was diluted with dry diethyl ether and the dye separated as an oil. The oil was separated by decantation and taken up in an acetone-ether mixture. The dye crystallized out and was recrystallized twice from acetone. A yield of green crystals was obtained which melted at 240–241° C. The dye sensitized a gelatino-silver chloro-bromide emulsion out to 660 mu with a peak at 600, an iodobromide emulsion out to 640 mu with a peak at 560 mu and 600 mu.

*Example VIII*

Preparation of the symmetrical carbocyanine dye of the formula:

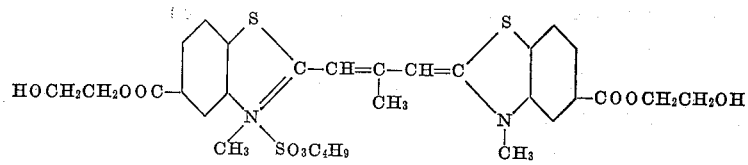

In a suitable reaction vessel there were placed 1.20 grams (0.005 mole) of 2-methyl-5-carbo-β-hydroxy ethoxybenzothiazole, 0.76 gram (0.005 mole) methyl n-butanesulfonate and the mixture was heated on an oil bath at a temperature of 120° C. for a period of two hours and then 3 ml. (0.018 mole) of ethyl orthoacetate and 15 ml. of anhydrous pyridine were added and the mixture heated to 116° C. under conditions of reflux for a period of three minutes. The resulting dye was precipitated out by the addition of diethyl ether and recrystallized from ethanol. The green-gold crystals recovered had a melting point of 175–9° C. and the dye had the above formula. An ethanol solution of this dye showed an absorption maximum at 543 millimicrons.

The dyes can also be made by reacting the silver salt of the alkane sulfonic acid with a cyanine dye salt having an iodide anion.

The invention is, of course, not limited to the specific dyes which are described in the foregoing examples. To the contrary the examples are representative of a large number of other dyes falling under the above generic formula which can be made in a similar manner as taught herein.

All of the dyes have the advantage that they are markedly more soluble in water than the conventional salts, e. g., the alkyl p-toluenesulfonate salts, alkyl halides and the alkyl sulfates. The unexpected differences in solubility of the new dye salts are exemplified by the symmetrical thiocarbocyanine dye salts of the formula:

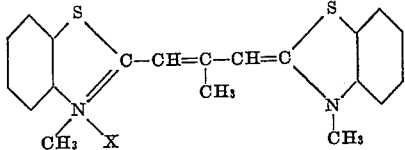

and the following table:

|  | Solubility of Dye in grams/100 ml. H₂O at 25° C. |
|---|---|
| I | 0.058 |
| p-toluenesulfonate | 0.069 |
| n-hexanesulfonate | 6.86 |
| n-butanesulfonate | 10.50 |
| ethanesulfonate | 7.50 |
| methanesulfonate | 5.13 |

A further advantage of the dye salts of this invention is that they do not leave a residual stain in the colloid-image-bearing layers of developed and fixed photographic elements. A further advantage is that they can be added to the emulsion from aqueous solution insuring uniformity and allowing freedom from organic solvents. Another advantage is that the alkyl n-butane-sulfonate dye salts are less toxic than dimethyl sulfates.

As many widely different embodiments of this invention can be made without departing from the spirit and scope thereof, it is to be understood that the invention is not to be limited except as defined by the claims.

What is claimed is:

1. The compounds of the formula:

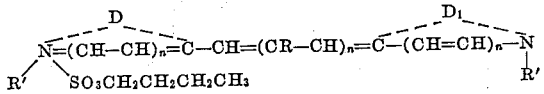

wherein D and D₁ are the atoms necessary to complete a 5- to 6-membered heterocyclic nitrogen nucleus, R is a member taken from the group consisting of hydrogen, alkyl and aryl radicals, R is an alkyl radical of 1 to 2 carbon atoms and n is a cardinal number from 0 to 1.

2. The compounds of the formula:

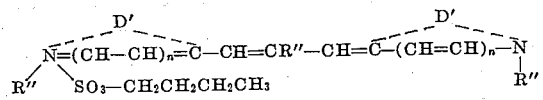

wherein R is an alkyl radical, D constitutes the atoms necessary to complete an azole radical and n is 0.

3. The compounds of the formula:

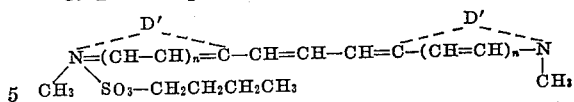

wherein D' constitutes the atoms necessary to complete an azole radical and n is 0.

4. The compounds of the formula:

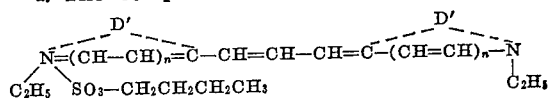

wherein D' constitutes the atoms necessary to complete an azole radical and n is 0.

5. The compound having the formula:

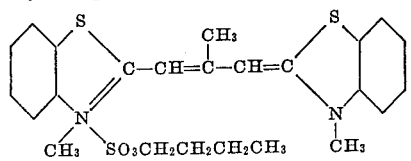

6. The compound having the formula:

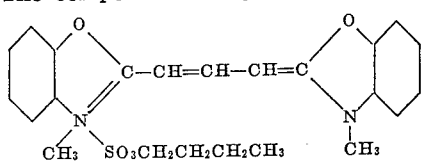

7. The compound having the formula:

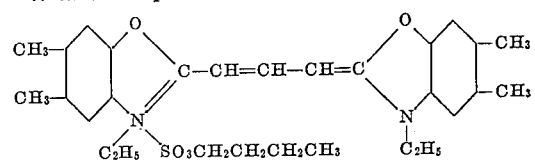

8. The compound having the formula:

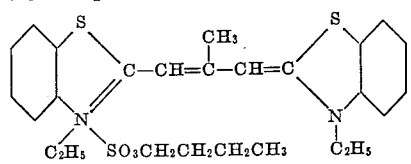

9. The compound having the formula:

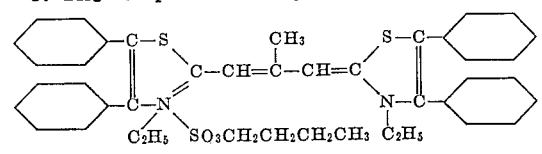

WILLIAM HOWELLS VINTON.

References Cited in the file of this patent

UNITED STATES PATENTS

| Number | Name | Date |
|---|---|---|
| 1,934,657 | Brooker | Nov. 7, 1933 |